Sept. 2, 1952 W. A. DOUGLAS 2,609,065
MEANS FOR SCAVENGING ENGINE BEARINGS
Filed Aug. 22, 1950 3 Sheets-Sheet 3
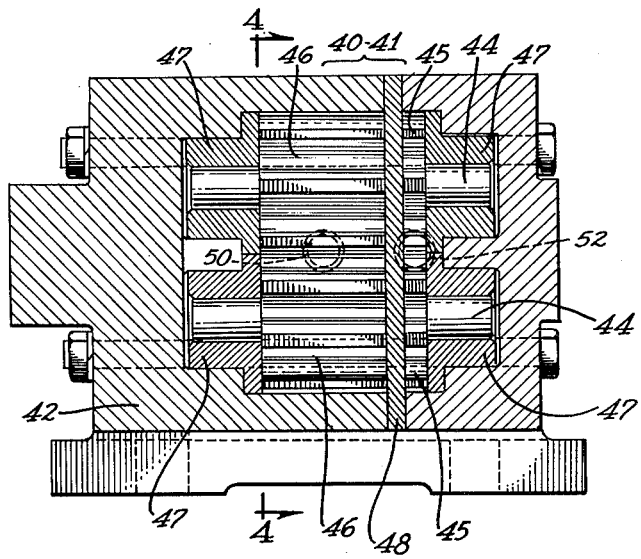
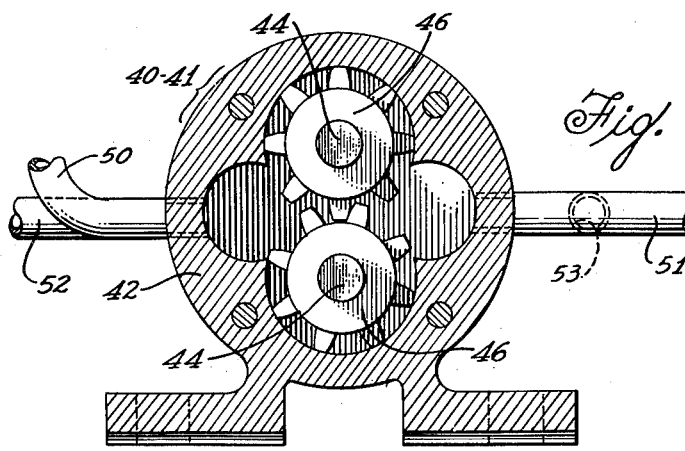
INVENTOR:
William A. Douglas
BY Herbert E. Metcalf
HIS PATENT ATTORNEY Patented Sept. 2, 1952

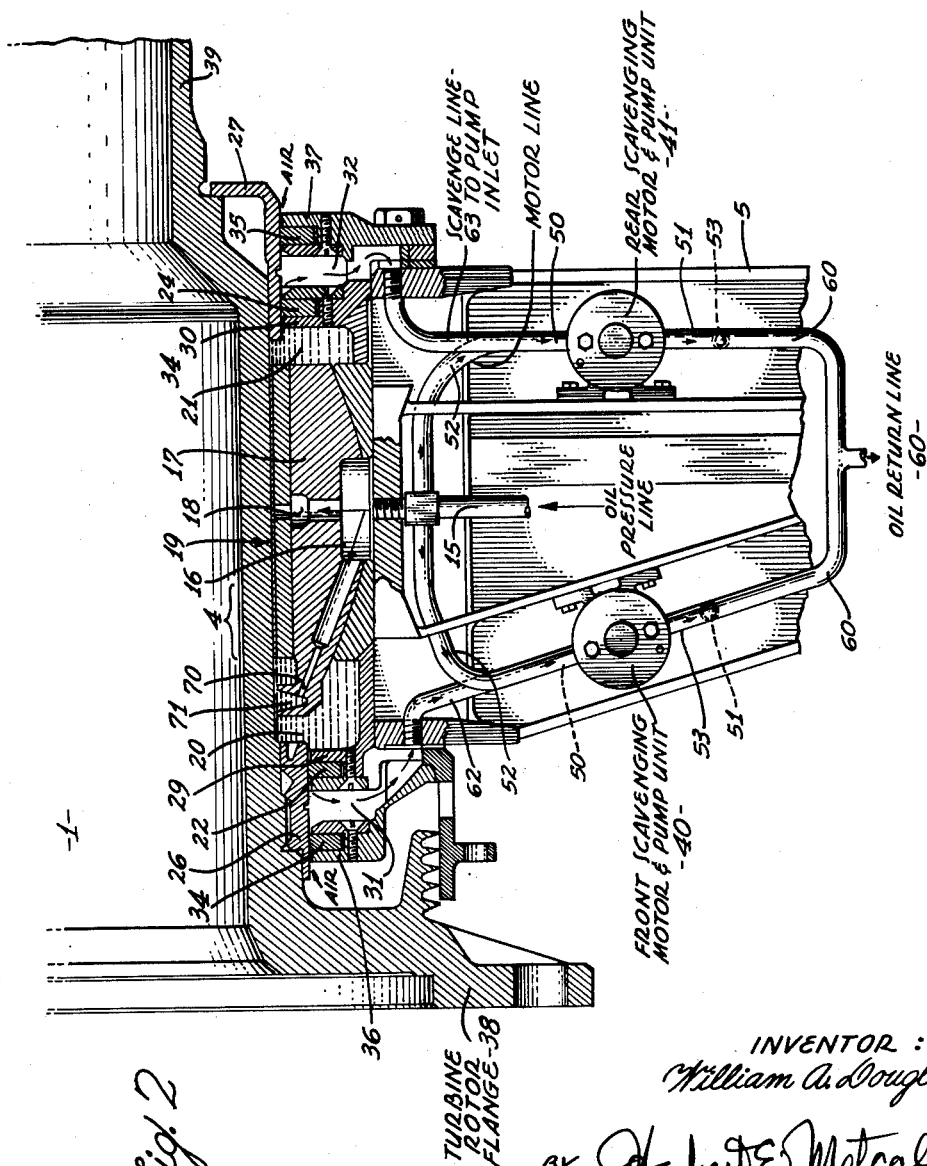

2,609,065

UNITED STATES PATENT OFFICE 2,609,065

MEANS FOR SCAVENGING ENGINE BEARINGS

William A. Douglas, Pasadena, Calif., assignor, by mesne assignments, to General Electric Company, Schenectady, N. Y., a corporation of New York Application August 22, 1950, Serial No. 180,726

6 Claims. (Cl. 184—6)

The present invention relates to a means for scavenging of lubricating oil from engine bearings, and more particularly to a bearing oil scavenging system wherein scavenge lines can be made extremely short.

Many types of engine bearings require lubricating oil scavenging for best operation. The term scavenging is used herein as meaning the removal of oil from the vicinity of the bearing by suction after it has been used by and passed through the bearing. However, it is desirable to keep suction lines to a scavenging pump as short as possible in order to reduce the pressure drop in them. Conventional scavenging pumps, however, must be located where a mechanical drive is available, and in many instances this requires the use of undesirably long suction lines.

It is an object of the present invention to provide a scavenging system for an engine bearing requiring no mechanical connection to the engine, and which, in consequence, can be located close to the bearing to be scavenged, irrespective of the position of the bearing.

It is another object of the invention to provide a simple and compact hydraulically driven scavenging pump system for an engine bearing.

It is still another object of the invention to provide a bearing scavenging system suitable for aircraft engines, in that scavenging is substantially independent of the engine attitude.

In brief, the present invention includes the use of a hydraulic motor driven by the lubricating oil being supplied under pressure to the bearing to be scavenged. This motor is located close to the bearing, and is preferably directly connected to a scavenging pump at the bearing so that a very short suction line into the bearing can be used. Both the scavenged oil and the oil used by the motor is passed to the oil return line. Thus, only a single main oil pressure pump need be mechanically connected to the engine.

My invention can be more readily understood by reference to the following description of the appended drawings in which:

Figure 2 is an enlarged view of one half of the rear bearing of the turbine shown in Figure 1, taken as indicated by the circle 2 in Figure 1.

Figure 3 is a longitudinal sectional view, somewhat diagrammatic, of one form of scavenging pump suitable for use in the turbine of Figure 1.

Figure 4 is a cross sectional view taken as indicated by the line 4—4 in Figure 3.

Figure 1:
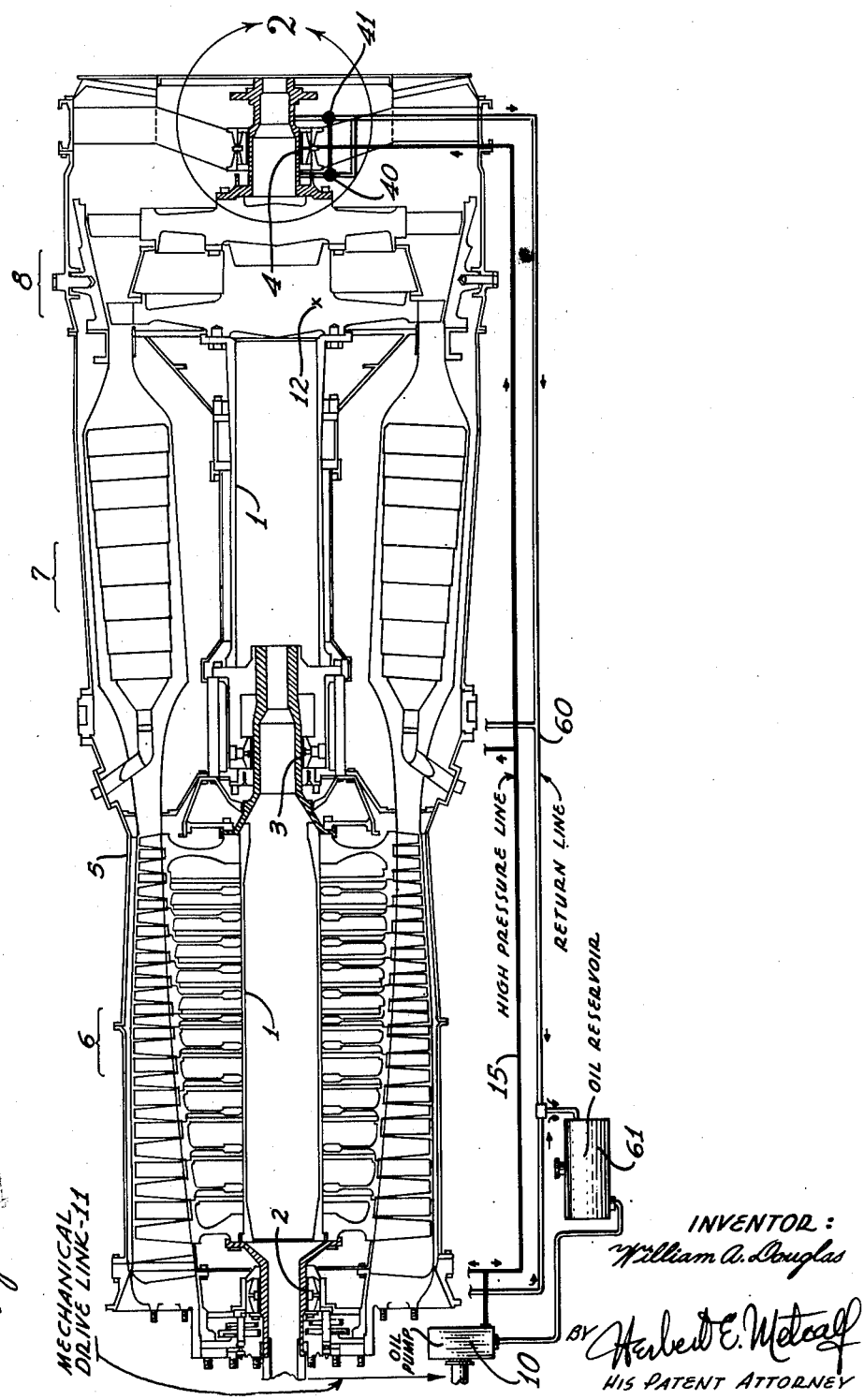
Figure 1 is a longitudinal sectional view of a combustion gas turbine, somewhat diagrammatic, showing in schematic form the main lubricating oil lines as supplied by a pump driven by a mechanical connection to the turbine.

Figure 1 shows a 10,000 H. P. gaseous combustion turbine of the turbo-prop type in which a composite hollow shaft 1 is supported on a front bearing 2, a center bearing 3 and a rear bearing 4; these bearings being supported from a casing 5. The turbine is divided into three parts, a compressor 6, a combustion portion 7 and a turbine 8.

As is customary in gas turbine design, accessory drives are taken from the compressor end of shaft 1 and are usually located in a fairing (not shown) located ahead of front bearing 2. Consequently, the usual location of an oil pump 10 is within this fairing, although in Figure 1, for convenience in illustration, the pump 10 is shown diagrammatically as positioned at the front of the casing 5 and indicated as being mechanically driven from shaft 1 as by a mechanical drive link 11.

As the lubrication of the rear bearing 4 poses the greatest problem, the present invention will be described as used in conjunction with that bearing, although it is to be distinctly understood that the present invention can be used for any or all of the bearings of the turbine.

Rear bearing 4 is closely adjacent to the turbine wheel 12 and, in consequence, is subject to heat in operation. Furthermore, it is highly important that oil be prevented from leaking from the bearing, as it would be liable to be ignited by the high temperatures of the turbine wheel and parts thereof or the exhaust gas. Consequently, it is very important that bearing oil, after use, be quickly and safely removed from the vicinity of the bearing.

In large gas turbines, however, the rear bearing may be, for example, 7 to 10 feet away from the accessory drive, so that even if a separate mechanically driven scavenging pump be used, in addition to the oil pressure pump 10, the drop in pressure in the long suction line from the rear bearing would be excessive, and would preclude adequate scavenging without the use of large scavenging pumps and large diameter scavenge lines.

In accordance with the present invention, this problem has been successfully solved by the use of hydraulically driven scavenging pumps positioned close to the bearing, as shown best in Figure 2.

A high pressure lubricating oil line 15 from the mechanically driven oil pump 10 is led through casing 5 to an annular distributing space 16 between casing 5 and a self-aligning bearing block 17. Bearing block 17 is provided with a plurality of radial oil supply holes 18 leading directly to the bearing surfaces 19 between shaft 1 and bearing block 17. From these supply holes 18 the lubricating oil is forced outwardly by the oil pressure along the bearing surfaces to be discharged into front and rear oil collection spaces 20 and 21, respectively.

The only exit for oil in spaces 20 and 21 is past front first oil retaining ring 22 and rear first oil retaining ring 24 formed of material such as oilite or bronze, for example, and pressing against shaft fairings 26 and 27, respectively, with from .001 inch to .002 inch clearance. The first oil retaining rings 22 and 24 are maintained loosely in place by first ring holders 29 and 30, respectively, so that they can rotate slowly by shaft contact friction. Shaft fairings 26 and 27 are considered to be part of the shaft, and, if desired, can be omitted with the oil retainers directly contacting the shaft surface.

As the lubricating oil, after having passed through the bearing, still retains some pressure, the used oil fills spaces 20 and 21 and then leaks past the junctions of the first oil retaining rings 22 and 24 with the shaft fairings 26 and 27, and then falls into front and rear scavenging spaces 31 and 32, respectively. These spaces are formed by second front and rear oil retaining rings 34 and 35 spaced from the first oil retaining rings 22 and 24, respectively, and held in mountings 36 and 37, respectively.

As the rear bearing 4 is closely adjacent the turbine rotor 12, which operates at high temperatures, heat is conducted from the rotor to turbine rotor flange 38 and thence along rear shaft stub 39. In order that the heat passing along the shaft stub be reduced before reaching the bearing surfaces 19, a plurality of cooling bores 70 are made to connect with distributing space 16 to deliver oil to an annular cooling ring 71 from which the cooling oil escapes into the forward oil collection space 20. This oil, added to the oil passing forwardly along bearing surfaces 19, also leaks by front first oil retaining ring 22 into front scavenging space 31.

Oil is scavenged from front and rear scavenging spaces 31 and 32 by scavenging motor-pump units 40 and 41, respectively, the motor being of the hydraulic type. While any type of hydraulic motor and hydraulic pump may be used, I prefer to use a direct connected unit as shown in Figures 3 and 4. Here, a unit casing 42 is provided interiorly with a pair of parallel shafts 44 on each of which is mounted a short motor gear 45 and a longer pump gear 46. Shafts 44 are mounted in shaft bearings 47 supported by unit casing 42 so that the gears mate. The motor gears 45 are spaced from the pump gears 46 to accommodate a gear partition 48 hydraulically separating the motor gears 45 from the pump gears 46. The pump gears 46 are provided with a pump inlet 50 and a pump outlet 51, and the motor gears 45 are provided with a motor inlet 52 and a motor outlet 53.

One of the units just above described is mounted in turbine casing 5 as close as possible to each end of the rear turbine bearing 4. The motor inlets 52 of both hydraulic motors are connected to the oil pressure line 15, close to the bearing 4, and the motor outlets 53 are connected to an oil return line 60 leading to an oil reservoir 61 from which oil for mechanically driven pump 10 is supplied.

The pump inlet 50 of the unit nearest the front end of bearing 4 is connected to front scavenging space 31 through front scavenge line 62, and the pump inlet 50 of the unit nearest the rear end of bearing 4 is connected to the rear scavenging space 32 by rear scavenge line 63. Both pump outlets 51 and both motor outlets 53 are connected to return line 60 close to the units.

In operation, as soon as the turbine is started, mechanically connected pump 10 supplies oil under pressure to oil pressure line 15. At the rear bearing, the oil under pressure in line 15 goes to the bearing surfaces 19 and simultaneously to both hydraulic motors, thereby rotating motor gears 45. As the motor gears 45 are directly connected to pump gears 46, these also are rotated to create a suction in scavenging spaces 31 and 32 rapidly removing all oil therefrom. The capacity of the pump gears 46 is made to be such that a substantial suction is created in the scavenging spaces 31 and 32 so that air from the atmosphere leaks into these spaces past the second oil retainer rings 34 and 35. This air leakage effectively prevents the leakage of any oil to the atmosphere and is particularly effective to prevent oil from reaching the turbine rotor flange 38 and turbine wheel 12 which, as above stated, run at relatively high temperatures.

One type of scavenging unit found effective for use in conjunction with the type of bearing herein described uses a pump section having a capacity of 10 gallons of oil per minute against a head of 2 pounds per square inch in return line 60, using 2 gallons per minute of oil in the motor section at 40 pounds per square inch.

While the present invention has been described for use in conjunction with gas turbine bearings, other uses will suggest themselves to those skilled in the art. For example, the scavenging system of the present invention is well adapted to scavenge the front ends of reciprocating aircraft engines when the airplane is in steep dives.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In combination with a gas turbine, a shaft and a shaft bearing lubricated by oil under pressure from a relatively remote oil pump driven from said shaft, an oil pressure line conducting oil under pressure from said remote pump to said bearing, an oil retainer at one end of said bearing, means forming a chamber positioned outside of said oil retainer and receiving oil from said bearing leaking past said oil retainer, a scavenging pump adjacent said chamber and connected to receive oil from said chamber, a hydraulic motor directly connected to operate said scavenging pump, said hydraulic motor being connected to said oil pressure line adjacent said bearing for operation by oil under pressure in said line, and an oil return line connected to receive oil discharged from said scavenging pump and from said motor and connected to return said discharged oil to said remote oil pump.

2. In combination with a gas turbine operated by high temperature motive fluid, a shaft and a shaft bearing lubricated by oil under pressure from a relatively remote oil pump driven from said shaft, an oil pressure line conducting oil under pressure from said remote pump to said bearing, a first oil retainer at one end of said bearing and defining therewith an oil collection space, a second oil retainer at the same end of said bearing and spaced from said first oil retainer to form a scavenging chamber receiving oil from said bearing leaking past said first oil retainer, a scavenging pump adjacent said chamber and connected to receive oil from said chamber, a hydraulic motor directly connected to operate said scavenging pump, said hydraulic motor being connected to said oil pressure line adjacent said bearing for operation by oil under pressure in said line, and an oil return line connected to receive oil discharged from said scavenging pump and from said motor and connected to return said discharged oil to said remote oil pump.

3. In combination with an aircraft engine adapted to utilize high temperature motive fluid, a shaft and a shaft bearing lubricated by oil under pressure from a relatively remote oil pump driven from said shaft, an oil pressure line conducting oil under pressure from said remote pump to said bearing, a first oil retainer at one end of said bearing serving to define an oil collection space therewith, a second oil retainer at the same end of said bearing and spaced from said first oil retainer to form a scavenging chamber receiving oil from said bearing leaking past said first oil retainer, a scavenging pump adjacent said chamber and connected to receive oil from said chamber, a hydraulic motor directly connected to operate said scavenging pump, said hydraulic motor being connected to said oil pressure line adjacent said bearing for operation by oil under pressure in said line, and an oil return line connected to receive oil discharged from said scavenging pump and from said motor and connected to return said discharged oil to said remote oil pump, said second oil retainer being exposed to the atmosphere on the side thereof opposite said chamber.

4. In combination with a gas turbine operated by high temperature motive fluid, a shaft and a shaft bearing lubricated by oil under pressure from a relatively remotely located oil pump driven from said shaft, an oil pressure line conducting oil under pressure from said remotely located pump to said bearing, an annular oil retainer having a portion contacting said shaft at one end of said bearing and spaced from said end to form an oil collection space receiving oil discharged from said bearing end, means forming a scavenging chamber on the opposite side of said oil retainer for receiving oil leaking past the junction of said retainer portion and said shaft, a scavenging pump adjacent said chamber and connected to receive oil from said chamber, a hydraulic motor directly connected to operate said scavenging pump, said hydraulic motor being connected to said oil pressure line adjacent said bearing for operation by oil under pressure in said line, and an oil return line connected to receive oil discharged from said scavenging pump and from said motor and connected to return said discharged oil to said remote oil pump.

5. In combination with a gas turbine operated by high temperature motive fluid, a shaft and a shaft bearing lubricated by oil under pressure from a relatively remotely located oil pump driven from said shaft, an oil pressure line conducting oil under pressure from said remotely located pump to said bearing, a first annular oil retainer having a portion contacting said shaft at one end of said bearing and spaced from said end to form an oil collection space receiving oil discharged from said bearing end, a second annular oil retainer having a portion bearing against said shaft and spaced from said first oil retainer to form a scavenging chamber, a scavenging pump adjacent said chamber and connected to receive oil from said chamber, a hydraulic motor directly connected to operate said scavenging pump, said hydraulic motor being connected to said oil pressure line adjacent said bearing for operation by oil under pressure in said line, and an oil return line receiving oil discharged from said scavenging pump and from said motor and connected to return said discharged oil to said remote oil pump.

6. Combination in accordance with claim 5 wherein the side of said second oil retainer opposite said chamber is open to the atmosphere and wherein said scavenging pump has sufficient capacity to maintain less than atmospheric pressure in said scavenging chamber.

WILLIAM A. DOUGLAS.

REFERENCES CITED

The following references are of record in the file of this patent:

UNITED STATES PATENTS

| Number | Name | Date |
|--------|------|------|
| 980,282 | Junggren | Jan. 3, 1911 |
| 2,155,218 | Cain | Apr. 18, 1939 |